United States Patent
Peer et al.

(10) Patent No.: US 8,199,748 B2
(45) Date of Patent: Jun. 12, 2012

(54) AUTOMATED CONFIGURATION OF A DIGITAL CROSS CONNECT

(75) Inventors: Francis W. Peer, Aldie, VA (US); James C. Jones, Silver Spring, MD (US)

(73) Assignee: Verizon Services Corp., Ashburn, VA (US)

(*) Notice: Subject to any disclaimer, the term of this patent is extended or adjusted under 35 U.S.C. 154(b) by 1034 days.

(21) Appl. No.: 11/828,631

(22) Filed: Jul. 26, 2007

(65) Prior Publication Data

US 2009/0028139 A1    Jan. 29, 2009

(51) Int. Cl.
    *H04Q 11/00* (2006.01)
(52) U.S. Cl. .................... 370/386; 370/395.31
(58) Field of Classification Search .......... 370/522, 370/389, 352; 455/420
    See application file for complete search history.

(56) References Cited

U.S. PATENT DOCUMENTS

| | | | | |
|---|---|---|---|---|
| 6,834,060 B1* | 12/2004 | Ward et al. | | 370/522 |
| 6,954,454 B1* | 10/2005 | Schuster et al. | | 370/352 |
| 2002/0101864 A1* | 8/2002 | Teixeira | | 370/360 |
| 2006/0179460 A1* | 8/2006 | Kumar et al. | | 725/86 |
| 2006/0224634 A1* | 10/2006 | Hahn et al. | | 707/200 |
| 2007/0037565 A1* | 2/2007 | Edmon | | 455/420 |
| 2007/0263546 A1* | 11/2007 | Chowdhury et al. | | 370/242 |
| 2009/0207985 A1* | 8/2009 | Cioffi et al. | | 379/93.01 |

FOREIGN PATENT DOCUMENTS

WO    WO 02/11335 A2 *    2/2002

* cited by examiner

*Primary Examiner* — Dang Ton
*Assistant Examiner* — Kevin Lee (57) ABSTRACT

A request is received to establish a requested connection in a digital cross connect between a first port and a second port. It is determined whether each of the first port and the second port are on a list of ports that are available for the connection. A command is issued to the digital cross connect to establish the requested connection.

14 Claims, 5 Drawing Sheets

AUTOMATED CONFIGURATION OF A DIGITAL CROSS CONNECT

BACKGROUND

Telephone line configurations, i.e., "talk paths," used in testing laboratories are generally fixed or "hard-wired," and are generally not dynamically configurable. Further, to the extent that configuration of talk paths may be said to be dynamic at all, such configuration generally must be performed by manually typing one or more command lines into a console.

Accordingly, challenges and inefficiencies in configuring a test environment can further complicate and slow a testing process. Possible concurrent combinations of test lines and test equipment available to a tester are generally limited by the number and location of test lines and test equipment. Configuration changes are generally time-consuming because configuration changes require that a human tester determine what configurations presently exist and what configurations are possible. Then a human tester is required to manually rewire telephone circuits to be used in a test.

The foregoing manual configuration changes generally may be performed only by a human tester with the appropriate level of knowledge and experience for all of the systems and/or equipment being tested. Many persons in a test laboratory generally lack this proper level of knowledge and experience for some, if not all, of these systems and/or equipment being tested.

DETAILED DESCRIPTION OF THE PREFERRED EMBODIMENTS

Figure 1:
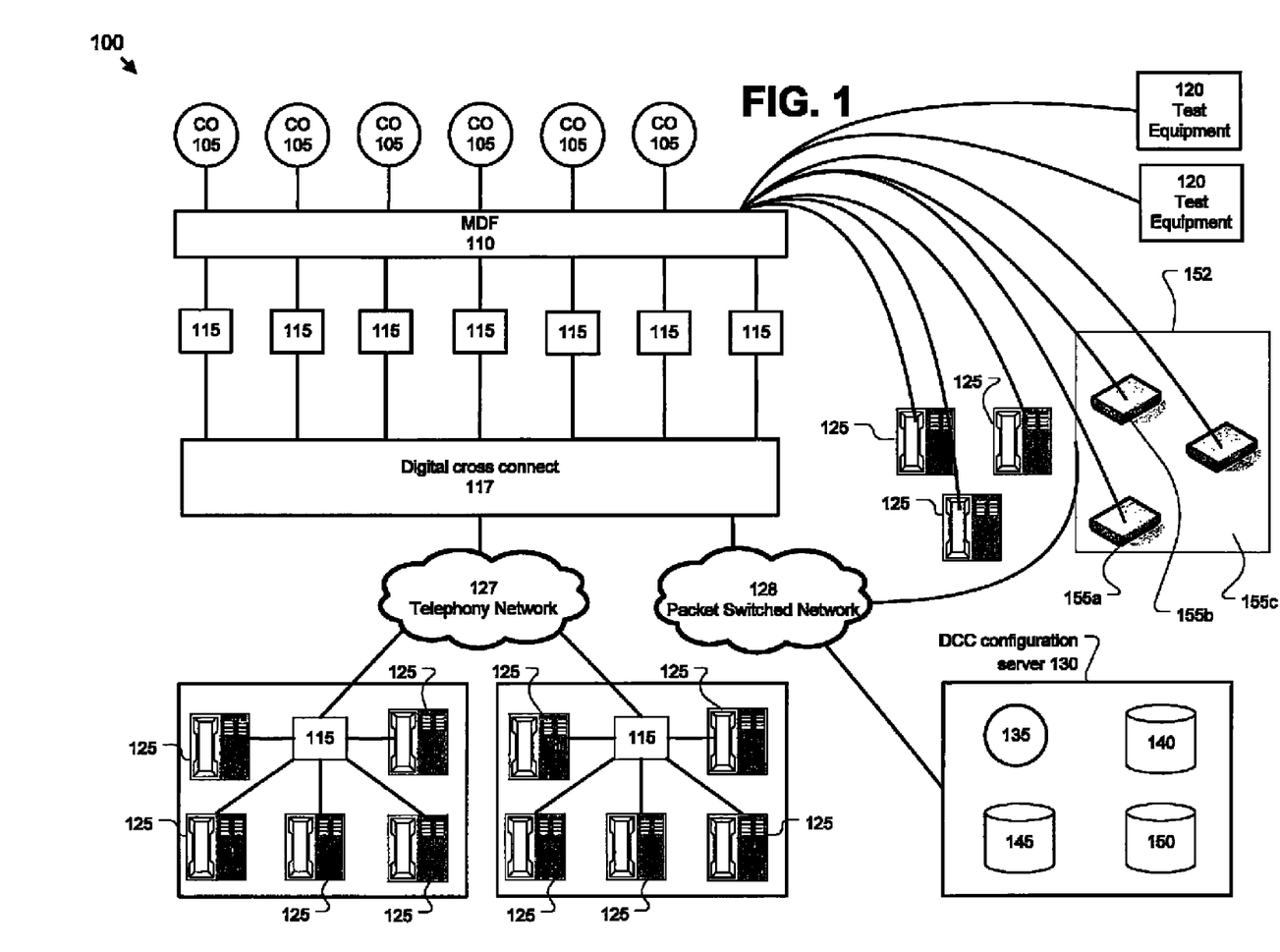
FIG. 1 illustrates an exemplary system for testing telephony equipment.

FIG. 1 illustrates a system 100 for testing telephony equipment, according to an exemplary embodiment.

Central office switches 105 may include any switches known for use in a telecommunications provider's network. Various switches 105 provide the ability to switch various kinds of communications, e.g., central office switches 105 may include packet lines, integrated services digital network (ISDN) lines, etc. Lines from switches 105 are connected to a main distribution frame (MDF) 110, which is used to physically connect lines within a central office. Lines from MDF 110 are connected to D4 digroups 115 that, as is known, provide an interface between Digital Signal 0 (DS0) lines and Trunk Level One (T-1) links. Of course, a D4 digroup is not required for central offices that provide a T1 interface.

MDF 110 is also connected to lines from test equipment 120 and/or telephones 125, modems 155, etc. Test equipment 120 may include load boxes, remote access devices (RADs), modems, etc. Telephones 125 may be any one of a variety of known telephones, analog or digital, including Integrated Services Digital Network (ISDN), P-set etc. A P-Set can, for example, use a proprietary message set from Nortel Networks, Inc. of Brampton, Ontario to manage a multi line business phone set. A P-set phone uses a single pair of wires to handle multiple lines, indicators and features. Further, telephones 125 may generally include any kind of terminating telephony equipment, i.e., equipment capable of receiving a telephone call. In any event, lines from test equipment 120 and/or telephones 125 are connected to a digroup 115 that provides T-1 transmissions, through a digital cross connect (DCC) 117, to a test network such as a telephony network 127.

DCC 117 is well known for providing data multiplexing and switching to connect lines that carry voice and data signals. As is known, lines are connected to ports in DCC 117, and DCC 117 allows users to digitally, rather than manually, connect lines by providing commands indicating which ports in DCC 117 are to be connected to one another. Exemplary techniques for automatically and efficiently mapping lines within DCC 117 are described herein.

A DCC configuration server 130 is generally a computing device such as discussed below. Configuration server 130 generally includes a mapping application 135, a configuration queue 140, a configuration database 145, and an interface script database 150. Databases 145 and 150 may be included within server 130, or may be located within a separate computing device. Similarly, configuration queue 140 is generally, but not necessarily, located within DCC configuration server 130. DCC configuration server 130 generally communicates with other elements of system 100 via packet switched network 128, and is used to automatically configure DCC 117 to cross-connect test lines to test equipment or telephone sets. Originating ports, i.e., ports in DCC 117 that are connected to lines that originate calls, and terminating ports, i.e., ports in DCC 117 that are connected to lines that receive calls, may thereby be efficiently connected. A test host 152 may be connected to, and used to control, modems 155.

Test telephony network 127 is a telephony network and as such may include a circuit switched network such as a network that operates in a manner similar to the known public switched telephone network (PSTN), although circuit switched network may be dedicated to test system 100. Network 127 may also include a private branch exchange (PBX), or other known network for switching and transporting telephony communications.

Packet switched network 128 may be an Internet Protocol (IP) network and may include or may be a subset of the Internet. Alternatively, packet switched network 128 can be a local area network (LAN) or the like that is separate from the Internet for increased security and control of bandwidth, among other reasons.

It will be understood that network 127 need not but could include or could be a packet switched network, such as a local area network (LAN), wide area network (WAN), e.g., the Internet, etc. Further, all or part of telephony network 127 can be part of a packet switched network such as packet switched network 128. Alternatively, networks 127 and 128 can be kept separate from one another to ensure that bandwidth on a packet switched network is not consumed by server traffic and the like to the point where there is insufficient bandwidth for carrying out telephony communications.

Figure 2A:
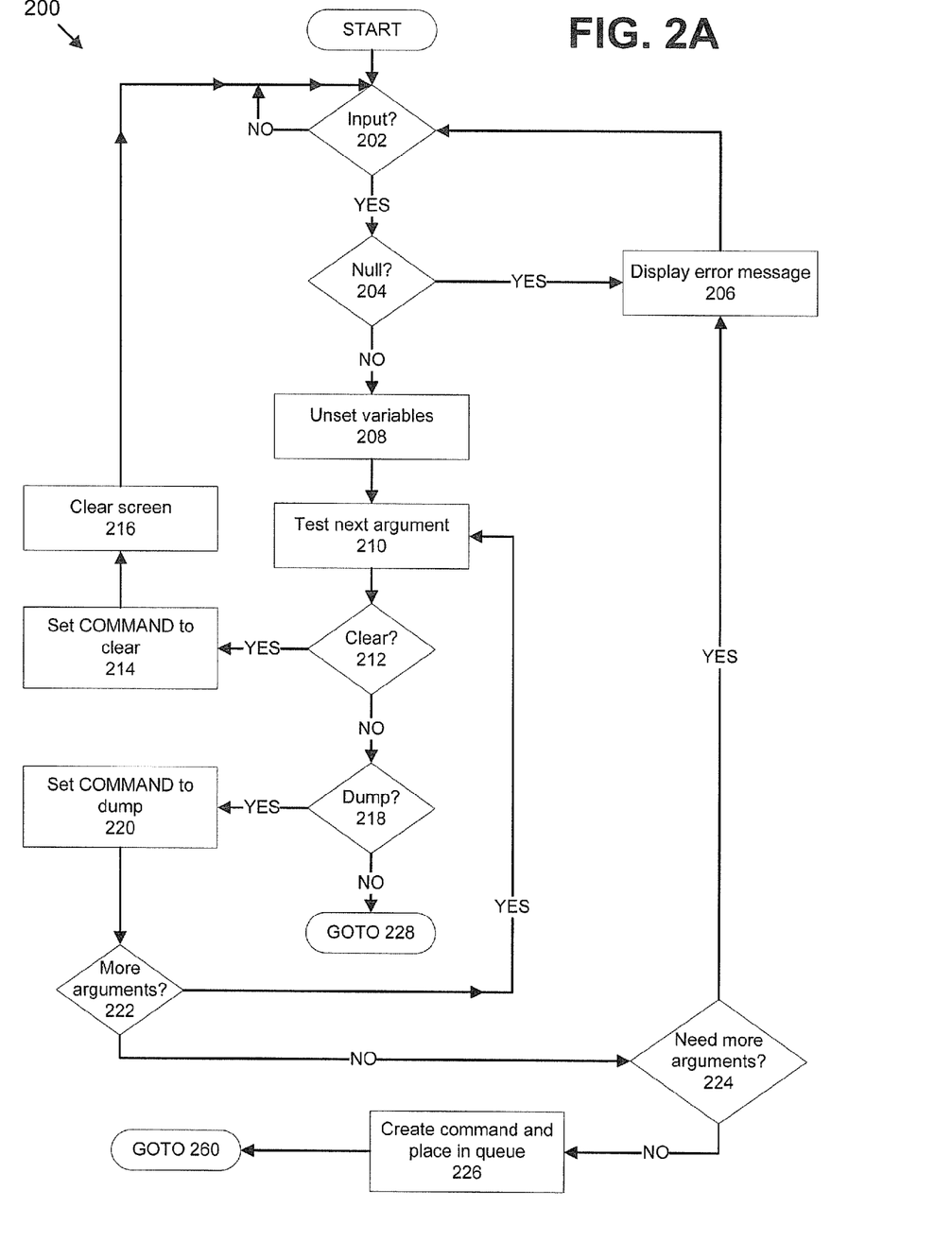
FIGS. 2A-2D illustrate an exemplary process for interacting with a digital cross connect, including automatically establishing connections between ports in the digital cross connect.

Mapping application 135 may be written in one or more programming languages and compiled or interpreted to provide computer-executable instructions for automatically establishing connections in DCC 117. For example, mapping application 135 may include multiple files written in a UNIX shell scripting language. Accordingly, mapping application 135 is sometimes referred to as a "cross-connect control script." Mapping application may be located within a computing device or devices other than DCC configuration server 130. Furthermore, certain features and operations of mapping application 135 are described in more detail below with reference to FIG. 2.

Configuration queue 140 is a queue of instructions for mapping application 135 to map ports in DCC 117. Instructions may be stored in queue 140 after being retrieved from database 145 until mapping application 135 is free to send such instructions to DCC 117. For example, mapping application 135 may include programming to send a first command to DCC 117 to connect two ports in DCC 117, and may be further programmed to await a response from DCC 117 before sending a second command to connect two ports in DCC 117. In such case, instructions to map, i.e., connect, ports in DCC 117 may be stored in configuration queue 140 until such time as mapping application 135 is ready to retrieve such instructions from queue 140 and a command based on such instructions may be sent to DCC 117.

Configuration database 145 generally includes a list of all of the ports in DCC 117 that a user is allowed to view and/or configure. In some instances, this list further restricts certain users to viewing certain ports in DCC 117 Configuration database 145 may further include stored sets of mappings, i.e., instructions for connecting ports in DCC 117, as discussed further below.

Interface script database 150 may include interface scripts that are optionally used to provide a graphical user interface (GUI) to configuration queue 140, although certain embodiments may use test interfaces such as a UNIX shell command line interface. For example, interface scripts 150 may include known web scripting and/or programming technologies, including one or more of hypertext markup language (HTML), JavaScript, Perl, PHP, etc. Among other things, an interface to DCC configuration server 130 such as a GUI may be used to specify line mappings, i.e., commands to connect one port in DCC 117 to another port in DCC 117, to store mapping configurations in configuration database 145, to view stored configurations, to specify configurations to be executed, etc.

The foregoing description of system 100 is provided for purposes of explanation and not limitation. It will be understood that the location and precise configuration of DCC 117 and DCC configuration server 130 are not critical to providing automated mapping for DCC 117 as described herein.

FIGS. 2A-2D illustrate an exemplary process 200 for interacting with DCC 117, including automatically establishing connections between ports in DCC 117. The present illustration of process 200 assumes that mapping application 135 has been invoked, and is awaiting user input. It is to be understood that mapping application 135 may be automatically invoked by a test application included in test host 152, or by a user accessing a user interface such as a command line interface, GUI, etc. that may be provided according to interface scripts from interface script database 150. Further, such an interface, GUI, etc. may be provided by DCC configuration server 130 and accessed using server 130 or some other client device connected to server 130 via network 128. Accordingly, it should be understood that, with respect to certain steps of process 200 described herein, the interaction with mapping application 135 attributed to a user could in fact be with test host 152 and/or a test application included therein, or some other suitable application. Further, a user may be required to log in to mapping application 135. As discussed below, mapping application 135 may retrieve from configuration database 145 a list of ports in DCC 117 that a particular user may configure.

Turning first to FIG. 2A, in step 202, mapping application 135 determines whether user input has been received. If not, process 200 remains in step 202 awaiting user input. However, if user input has been received, then step 204 is executed next.

A user may provide input in step 202 using any one of a number of known input devices, such as a keyboard or the like. Further, mapping application 135 may provide a user with the ability to specify a set of configurations for one or more connections of ports in DCC 117, and then retrieve such configurations from configuration database 145. Accordingly, input received as described above with respect to step 202 could in fact be input from a file, SQL query results, etc. retrieved from database 145. Exemplary inputs that may be received in step 202 include the exemplary commands and command parameters included below in Table 1. Commands and command parameters input by a user may be stored in program variables in mapping application 135 in a known manner.

TABLE 1

| Command | Meaning |
| --- | --- |
| dump 024 | Dump, i.e., retrieve and display, connection information for network processing card (NPC) 024 |
| map 024003 037006 | Map NPC 024 channel 003 to NPC 037 channel 006 |
| clear | Clear the screen of a computer running map application 135. |
| exit | Exit map application 135 (and log out of DCC 117 if necessary). |
| help | Cause a help screen to be displayed. |

In step 204, mapping application 135 determines whether the user input received in step 202 is a null value, or whether such input cannot be parsed to a valid command, such as one of the commands described above. For example, a user simply pressing an "enter" key in response to a command line prompt would produce a null value. If the user input received in step 202 is a null value, then step 206 is executed next. However, if the user input received in step 202 is not a null value, then step 208 is executed next.

In step 206, mapping application 135 displays an error message to a user, e.g., through a display of a computer that the user is using to access mapping application 135. Such error message may be tailored according to the condition that has directed process 200 to step 206. For example, when step 206 follows step 204, the displayed error message may include a statement such as "Null or un-parsable value received. Please try again." Other appropriate error messages may be provided when step 206 follows other steps of process 200.

In step 208, which may follow step 204, mapping application 135 clears, i.e., sets to null values, a set of variables used to store information relating to user commands, e.g., program variables such as mentioned above with respect to step 202.

In step 210, mapping application 135 tests the next available argument in a command input received as described above with respect to step 202. An argument may be either a command, e.g., "dump," or a parameter to a command, e.g., "024." Of course, mapping application 135 may include instructions to detect an error condition when no next available argument exists. However, in general, step 210 will either be visited because a command has been newly parsed and therefore an argument will exist because a command input necessarily has at least one argument, or because, as discussed below with respect to step 222, mapping application 135 has determined that additional arguments exist in the input received in step 202.

In step 212, mapping application 135 determines whether the argument tested in step 210 is a "clear" command. If so, step 214 is executed next. Otherwise, step 218 is executed next.

In step 214, mapping application 135 sets a command variable, i.e., a variable holding a value of a command provided from a user, to "clear."

Next, in step 216, mapping application 135 causes a display or screen being accessed by a user of mapping application 135 to be cleared, i.e., text and graphics on the screen are removed, after which generally only a cursor is shown. Following step 216, process 200 returns to step 202.

In step 218, mapping application 135 determines whether the argument tested in step 210 is a "dump" command. If not, step 228 is executed next. However, if the argument tested in step 210 is a "dump" command, then step 220 is executed next.

In step 220, mapping application 135 sets the command variable to "dump."

Next, in step 222, mapping application 135 determines whether the input received as described above with respect to step 202 includes additional arguments that have not yet been tested. If so, process 200 returns to step 210. Otherwise, step 224 is executed next.

In step 224, mapping application 135 determines whether the input received in step 202 should have included arguments in addition to arguments tested as described above. For example, a "map" command, discussed further below, may include three arguments, the "map" command itself and also parameters indicating an origin and a termination for mapping, e.g., as described further below. If additional arguments are needed, step 206 is executed next, i.e., an error condition is reported. However, if no additional arguments are needed, step 226 is executed next.

In step 226, the command received in step 202, parsed as described above, is placed in configuration queue 140. Following step 226, process 200 proceeds to step 260.

Figure 2B:
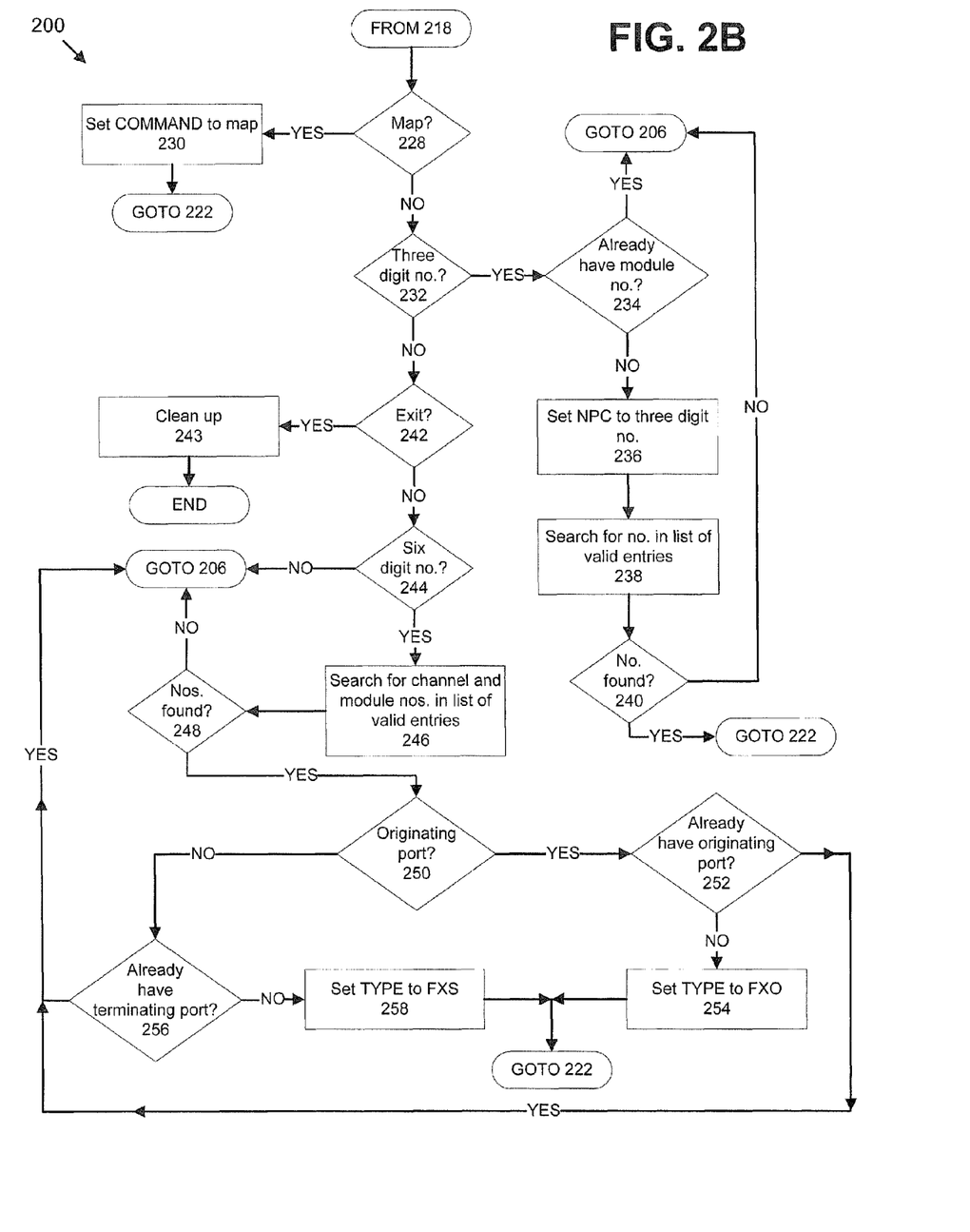

Turning now to FIG. 2B, as noted above, step 228 is executed following step 218 when mapping application 135 determines that the argument tested in step 210 is not a "dump" command. In step 228, mapping application 135 determines whether the arguments tested in step 210 is a "map" command. If so, step 230 is executed next. Otherwise, step 232 is executed next.

In step 230, mapping application 135 sets the command variable to "map." Following step 230, step 222 is executed.

In step 232, mapping application 135 determines whether the argument tested in step 210 is a three digit number. If so, the three digit number is presumed to represent a network processing card (NPC), sometimes referred to as a "module," and step 234 is executed next. Otherwise, step 242 is executed next.

In step 234, mapping application 135 determines whether a module number has already been identified from the input received in step 202. If so, an error condition is identified, and step 206 is executed next. Otherwise, step 236 is executed next.

In step 236, mapping application 135 sets a variable for holding a module identifier, i.e., a module number, sometimes referred to as the NPC variable, to the value of the three digit number identified in step 232.

Next, in step 238, mapping application 135 searches a list of valid module identifiers, e.g., such as may be stored in database 145, for the module identifier identified in step 232. In some cases, a subset of valid module identifiers in the list of valid module identifiers may be searched according to an identifier associated with the user, such identifier being provided when the user logs in to mapping application 135 as mentioned above. That is, not all users of mapping application 135 may be entitled or permitted to modify connections associated with all NPCs. In some cases, a user profile may be accessed that identifies a subset of NPCs that a user may access, e.g., NPCs identified by a particular range of three digit numbers.

Next, in step 240, mapping application 135 determines whether the module identifier identified in step 232 was found in step 238. If so, step 222 is executed next. Otherwise, an error condition is identified, and step 206 is executed next.

In step 242, which may follow step 232, mapping application 135 determines whether the input received in step 202 includes a command to exit mapping application 242. If so, step 243 is executed next. Otherwise, step 244 is executed next.

In step 243, mapping application 135 performs various "cleanup" operations prior to exiting. For example, it may be desirable to delete any temporary files that may have been created, to delay to await report on any operations that may have been performed with respect to DCC 117, as described below, etc.

Following step 243, process 200 ends.

In step 244, which may follow step 242, mapping application 135 determines whether the argument tested in step 210 is a six digit number. If so, the six digit number is presumed to represent a combination of an NPC identifier (the first three digits) and a channel associated with the NPC (the latter three digits), and step 246 is executed next. Otherwise, an error condition arises and step 206 is executed next.

In step 246, mapping application 135 searches a list of valid module identifiers, e.g., such as may be stored in database 145, for the module identifier identified in the six digit number, and also searches a list of valid channel identifiers, e.g., such as may be stored in database 145 for the channel identifier identified in the six digit number. As discussed above with respect to step 238, a user profile or the like may be accessed and may be used to limit access of a particular user to particular NPCs, i.e., modules, and/or particular channels.

Next, in step 248, mapping application 135 determines whether the module identifier and channel identifier identified in the six digit number were found in the list or lists of valid module identifiers and channel identifiers. If not, an error condition arises and step 206 is executed next. Otherwise, step 250 is executed next.

In step 250, mapping application 135 determines whether the module/channel identifier identified in the six digit number are for an originating port, the alternative being that the identifiers designate a terminating port. If an originating port is designated, then step 252 is executed next. Otherwise, step 256 is executed next. It is to be understood that the flow of data between first and second ports is generally bi-directional, and that references such as "to" and "from," or "originating" and "terminating," are made for convenience. By way of illustration, in the exemplary command "map 024003 037006," the numbers "024003" could represent an originating port and the numbers "037006" could represent a terminating port.

In step 252, mapping application 135 determines whether an originating port has already been specified as part of input received as described above with respect to step 202. If so, an error condition arises, and step 206 is executed next. Otherwise, step 254 is executed next.

In step 254, a "type" variable in mapping application 135 is set to indicate that a connection type of an originating port is to be associated with the six digits identified in step 244. For example, the type variable could be set to "FXO" to indicate an originating port. Following step 254, process 200 returns to step 222.

In step 256, mapping application 135 having determined in step 250 that an originating port is not specified in the six digit number, the only alternative is that a terminating port is specified. Therefore, in step 256, mapping application 135 determines whether a terminating port has already been specified as part of input received as described above with respect to step 202. If so, an error condition arises, and step 206 is executed next. Otherwise, step 258 is executed next.

In step 258, the type variable is set to indicate that a connection type of a terminating port is to be associated with the six digits identified in step 244. For example, the type variable could be set to "FXS" to indicate a terminating port. Following step 258, process 200 returns to step 222.

Figure 2C:
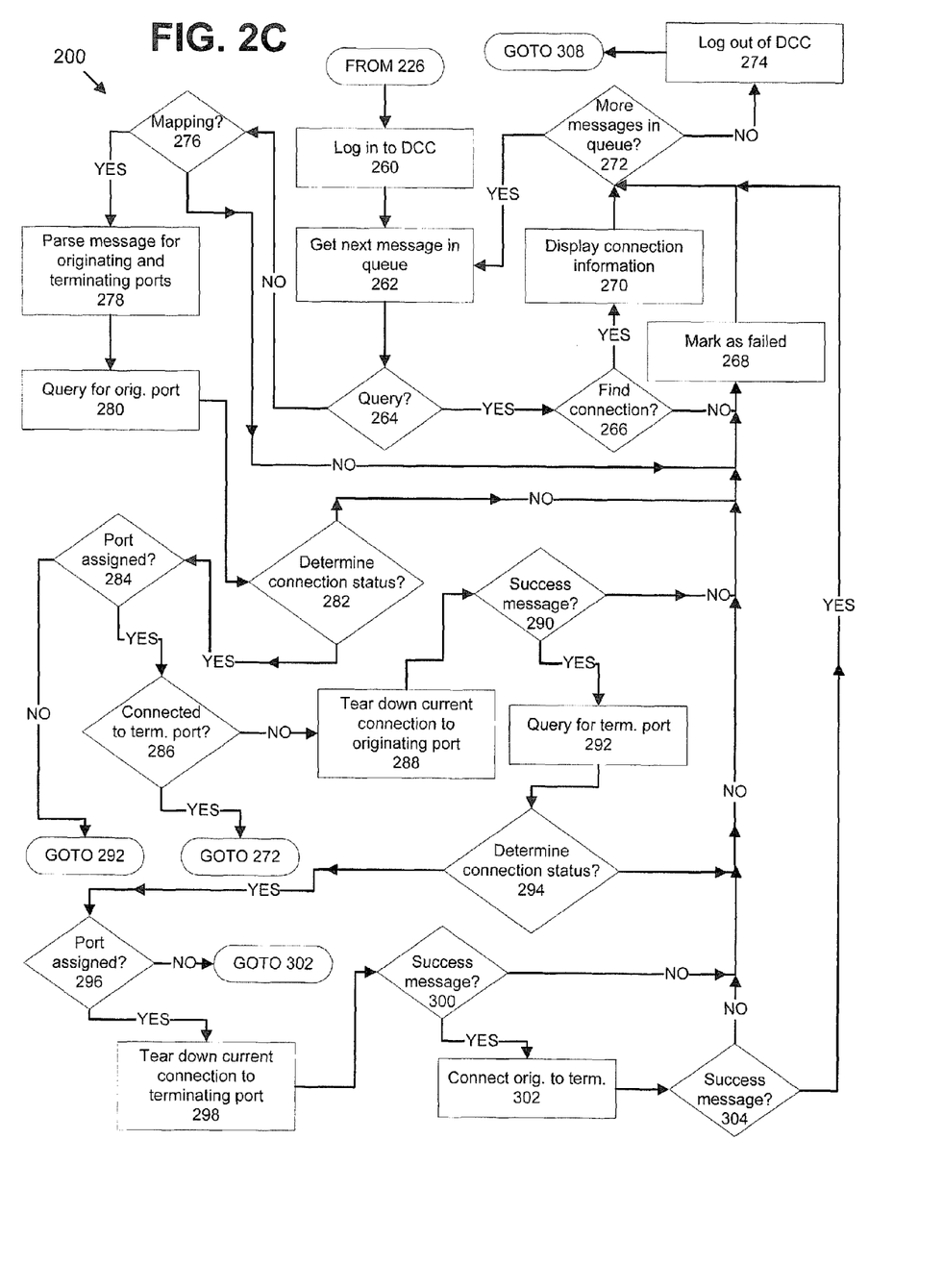

Turning now to FIG. 2C, step 260 may follow step 226, described above. In step 260, mapping application 135 logs in to DCC 117. Such a login is generally accomplished in a known manner. DCC 117 may, for example, include a proprietary operating system or an operating system such as the well known AIX UNIX operating system provided by International Business Machines of Armonk, N.Y. In such case, commands can be formatted for DCC 117 according to AIX UNIX. Further, it will be understood that commands for DCC 117 will generally include codes or the like for specifying particular T1 modules or NPCs, channels, ports, etc. Moreover, server 130 and/or mapping application 135 may be limited to accessing particular ports or groups of ports in DCC 117. For example, one exemplary implementation includes a table stored in test host 130 specifying particular ports that may be the subject of commands and queries in DCC 117. Similar limitations could also be imposed according to particular users as mentioned above.

Next, in step 262, mapping application 135 retrieves the next available message, e.g., command formulated as described above, from configuration queue 140.

Next, in step 264, mapping application 135 determines whether the retrieved message is a query for information, in which case the step 266 is executed next. For example, the retrieved message may include a "dump" command. However, if the retrieved message is not a query for information, then it may be a mapping command, and step 276 is executed next.

In step 266, mapping application 135 attempts to obtain from DCC 117 information concerning the connection that is the subject of the query requested in the message retrieved as described above with respect to step 262. If the requested connection is found, step 270 is executed next. However, if the requested connection is not found, step 268 is executed next. It is to be understood that in the event that the requested connection is not found, a failure to retrieve such information generally indicates an issue with DCC 117 or mapping application 135.

Generally, to retrieve information concerning a connection as in step 266, a message must be sent to DCC 117 to determine where ports are currently connected. For example, the format of a response from DCC 117 may show where all 24 ports of a module are connected. Mapping application 135 generally makes use of such a response to ensure that information concerning a connection was requested and received, and then to provide the results to the user or program that requested it.

In step 268, the message retrieved in step 262 is marked as "failed." Marking a message as failed allows mapping application to report the failure to a user of mapping application 135 once mapping application 135 has logged out of DCC 117, e.g., as described below with respect to step 308. Messages marked as failed may or may not have been executed. For example, if a message provided insufficient information, a command cannot be executed. For example, in the case of invalid equipment selections (e.g., of NPCs or channels), a command is not executed. However, in the event of a failure to obtain information concerning a requested connection as described above concerning step 266, a query message may have been sent, and DCC 117 either failed to respond, or did not respond as expected. As an example, such failure could be caused by an error in both the command and tables in mapping application 135 which allowed the user to request a dump of a non-existent NPC. Such a failure, although generally unlikely, could imply a problem in either mapping application 135, the DCC 117, the communications between the two, or supporting tables in mapping application 135.

In step 270, mapping application 135 displays requested connection information, e.g., found as described above with respect to step 266, to a user, e.g., in a display of a computer used to run mapping application 135. For example, a command to "dump" a particular NPC may result in a display of all channels of the NPC and corresponding channels and NPCs to which the particular NPC is connected.

In step 272, which may follow either step 268, step 270, or step 304, mapping application 135 determines whether there are additional messages and configuration queue 140. If so, process 200 returns to step 262. Otherwise, process 200 proceeds to step 274.

Figure 2D:
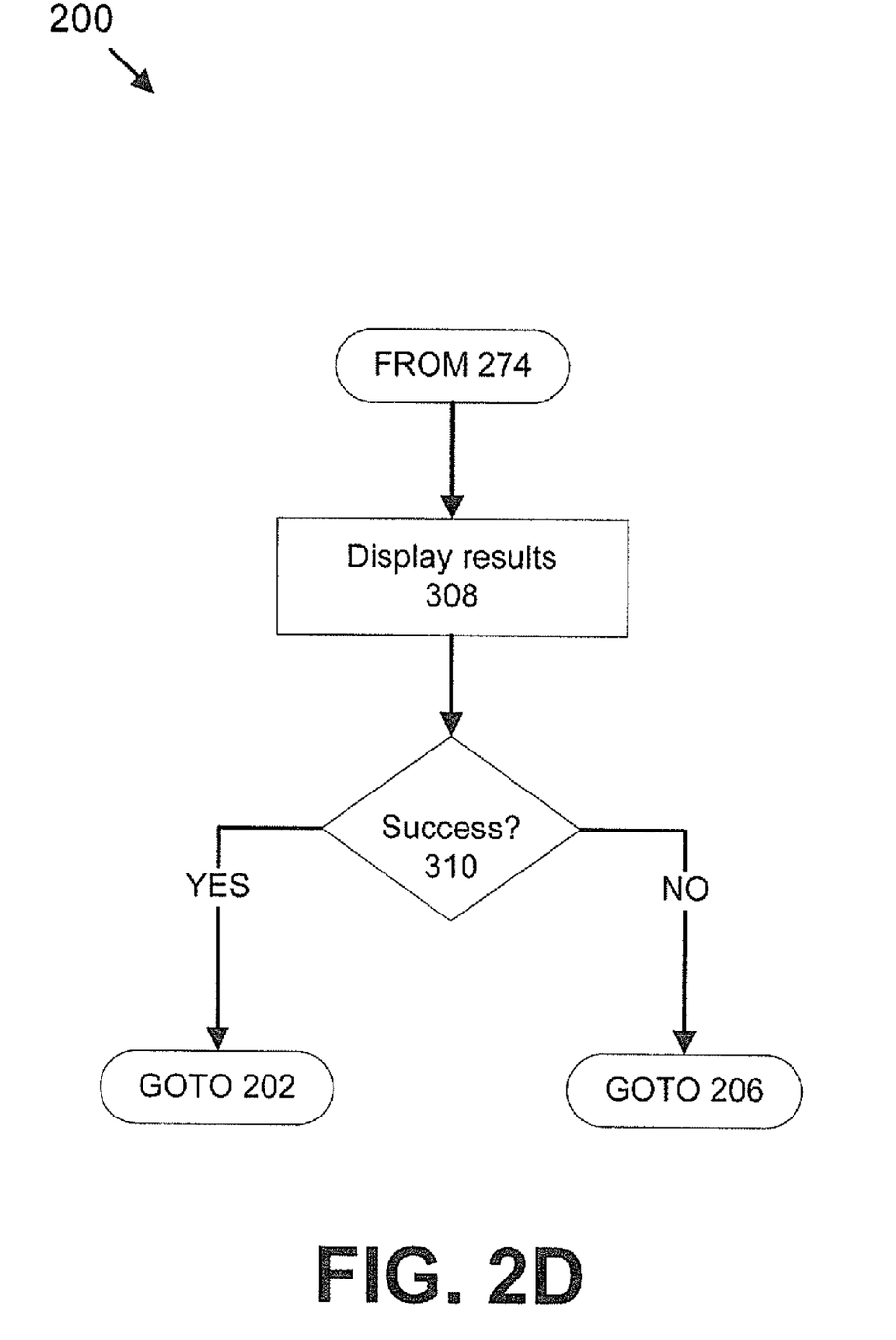

In step 274, mapping application 135 logs out of DCC 117. Following step 274, process 200 proceeds to step 308. Step 308 and subsequent steps are illustrated in FIG. 2D.

As noted above, step 276 may follow step 264. In step 276, mapping application 135 determines whether the message retrieved in step 262 includes a mapping command. If not, then process 200 proceeds to step 268 to mark the message as failed. However, if the message retrieved in step 262 does include a mapping command, then step 278 is executed next.

In step 278, mapping application 135 parses the message retrieved in step 262 to identify originating and terminating ports that are to be mapped. For example, in a mapping command including the word "map" followed by two sets of six digit numbers, a first set of six digit numbers may indicate an originating port, and a second set of six digit numbers may indicate a terminating port.

In step 280, mapping application 135 queries DCC 117 to determine a status of the originating port specified in the message retrieved in step 262.

Next, in step 282, upon receiving a response to the query of step 280, mapping application 135 determines whether a connection status of the originating port specified in the message retrieved in step 262 could be determined. If so, step 284 is executed next. Otherwise, process 200 proceeds to step 268 to mark the current message as failed. Possible causes of a failure to determine a connection status are discussed above, e.g., with respect to step 268.

In step 284, mapping application 135 determines whether the originating port specified in the message retrieved in step 262 is presently assigned to any connection. If so, step 286 is executed next. If not, step 292 is executed next.

In step 286, mapping application 135, having determined that the originating port specified in the message received in step 262 is assigned to a connection, determines whether the specified originating port is connected to the terminating port specified in the message. If so, mapping application 135 does not need to perform any mapping with respect to these two ports, because they are already connected as the user wishes, and therefore process 200 proceeds to step 272. Otherwise, step 288 is executed next.

In step 288, mapping application 135 sends an instruction to a DCC 117 to tear down the current connection that uses the originating port specified in the message received in step 262, i.e., the connection identified as described above with respect to step 284.

Next, in step 290, mapping application 135 determines whether a message has been received from DCC 117 indicating that the tear down instruction of step 288 was successful. If a success message has been received, step 292 is executed next. Otherwise, process 200 proceeds to step 268.

In step 292, mapping application 135 queries DCC 117 to determine a status of the terminating port specified in the message retrieved in step 262.

In step 294, mapping application 135, upon receiving a response to the query of step 290, mapping application 135 determines whether a connection status of the terminating port specified in the message retrieved in step 262 could be determined. If so, step 296 is executed next. Otherwise, process 200 proceeds to step 268 to mark the current message as failed.

In step 296, mapping application 135 determines whether the terminating port specified in the message retrieved in step 262 is presently assigned to any connection. If so, step 298 is executed next. If not, step 302 is executed next.

In step 298, mapping application 135 sends an instruction to a DCC 117 to tear down the current connection that uses the terminating port specified in the message received in step 262, i.e., the connection identified as described above with respect to step 296.

Next, in step 300, mapping application 135 determines whether a message has been received from DCC 117 indicating that the tear down instruction of step 298 was successful. If a success message has been received, step 302 is executed next. Otherwise, process 200 proceeds to step 268.

In step 302, mapping application 135 sends an instruction to DCC 117 to establish a connection between the originating and terminating ports specified in the message described above with respect to step 262.

Next, in step 304, mapping application 135 determines whether a message has been received from DCC 117 indicating that the tear down instruction of step 288 was successful. If a success message has been received, step 272 is executed next. Otherwise, process 200 proceeds to step 268.

Turning now to FIG. 2D, next, in step 308, mapping application 135 causes a description of results of execution of commands from configuration queue 140 to be displayed on a display accessible to a user of mapping application 135. For example, for each command executed or attempted to be executed from configuration queue 140, mapping application 135 might display the command along with an indicator such as "success" or "fail."

Next, in step 310, mapping application 135 determines whether it was able to successfully display information relating to all commands executed or attempted to be executed from configuration queue 140. If so, process 200 returns to step 202. Otherwise, an error condition arises in step 206 is executed.

As noted above, process 200 may end after an exit command is received as described with respect to step 242, and cleanup is performed as described with respect to step 243.

Conclusion

Systems and methods for testing telephony services, e.g., in an integrated telephony call management service (ITCMS), are further described in co-pending U.S. patent application Ser. No. ________, entitled "TEST AUTOMATION FOR AN INTEGRATED TELEPHONY CALL MANAGEMENT SERVICE," and filed the same day as the present application, the contents of which are fully incorporated herein by reference in their entirety.

It is to be understood that computing devices used to implement presently disclosed systems, methods, applications, etc., such as DCC configuration server 130 and test host 152, may include any one of a number of well known computing devices, including, without limitation, a computer workstation, a desktop, notebook, laptop, or handheld computer, or some other known computing device, such as a Java-enabled cellular telephone or similar device. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Databases 145, 150, etc. generally include database management software running on a computer such as is described above with reference to test host 152, such computer including an operating system such as described above. Database management software may store data on a computer-readable medium in a structured file (e.g., comma delimited, tab delimited, etc.), in a hierarchical format, a relational format, etc. For example, databases 145, 150, etc. may include a relational database management system (RDBMS) such as is well known, e.g., the Oracle database provided by Oracle Corporation of Redwood Shores, Calif. An RDBMS generally employs the well known Structured Query Language (SQL) in addition to a language for creating, storing, editing, and executing stored procedures, e.g. Oracle's PL/SQL. However, it is to be understood that databases 145, 150, etc. may be some other kind of database such as a hierarchical database, a file, a set of files, an application database in a proprietary format, etc.

Computer executable instructions such as stored and executed on configuration server 130 and test host 152 may be compiled or interpreted from computer programs created using a variety of known programming languages and/or technologies, without limitation, and either alone or in combination, Java™, C, C++, Visual Basic, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention. Accordingly, it is to be understood that the above description is intended to be illustrative and not restrictive. Many embodiments and applications other than the examples provided would be apparent to those of skill in the art upon reading the above description.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a digital cross connect that includes a plurality of originating ports and a plurality of terminating ports;
   a plurality of originating lines, at least some of the originating lines each selectively connected to one of the originating ports;
   a plurality of terminating lines, at least some of the terminating lines each selectively connected to one of the terminating ports;
   a mapping application that retrieves a mapping from a set of predetermined mappings in a configuration database, stores the mapping in a queue in the database, and executes the mapping from the queue, each mapping including a predetermined set of commands for connecting an originating port to a terminating port in the digital cross connect; and
   a packet switched network connected to the digital cross connect and the mapping application, wherein the mapping application is configured to determine, prior to issuing a command of the predetermined set of commands, whether the one of the terminating ports and the one of the originating ports requested by a user may be accessed by the user and whether the one of the terminating ports and the one of the originating ports requested by a user may be connected to each other according to a type of line associated with each of the one of the terminating ports and the one of the originating ports.

2. The system of claim 1, further comprising:
   a plurality of switches, each switch connected to one or more of the originating lines; and
   a plurality of terminating telephony equipment, each terminating telephony equipment connected to one of the terminating lines.

3. The system of claim 2, wherein at least one of the telephony equipment is a computer modem.

4. The system of claim 1, wherein the mapping application is configured to determine, prior to issuing a command of the predetermined set of commands, whether the one of the terminating ports and the one of the originating ports requested by a user are available in the digital cross connect.

5. A method, comprising:
   receiving a request to establish a requested connection in a digital cross connect between a first port and a second port;
   determining whether each of the first port and the second port are on a list of ports that are available for the connection;
   determining that at least one of the first port and the second port is presently unconnected;
   determining whether the first port and the second port requested by a user may be accessed by the user;
   determining whether the first port and second port may be connected to each other according to a type of equipment associated with each of the first port and the second port;
   retrieving a command from a queue that includes a set of predetermined commands for establishing a connection in the digital cross connect; and issuing the command to the digital cross connect to establish the requested connection.

6. The method of claim 5, further comprising determining present connections for each of the first ports and the second ports.

7. The method of claim 5, further comprising determining if the first port is presently connected to the second port.

8. The method of claim 5, further comprising issuing a command to tear down a first connection to at least one of the first port and the second port prior to issuing the command.

9. The method of claim 5, embodied on a tangible and non-transitory computer-readable medium as a set of computer-executable instructions.

10. A system, comprising:
    a digital cross connect that includes a plurality of originating ports and a plurality of terminating ports;
    a plurality of originating lines, at least some of the originating lines each selectively connected to one of the originating ports;
    a plurality of terminating lines, at least some of the terminating lines each selectively connected to one of the terminating ports;
    a mapping application that retrieves a mapping from a set of predetermined mappings in a configuration database, stores the mapping in a queue in the database, and executes the mapping from the queue, each mapping including a predetermined set of commands for connecting an originating port to a terminating port in the digital cross connect, wherein the mapping application is configured to determine, prior to issuing a command of the predetermined set of commands, whether the one of the terminating ports and the one of the originating ports requested by a user may be accessed by the user and whether the one of the terminating ports and the one of the originating ports requested by the user may be connected to each other according to a type of line associated with each of the one of the terminating ports and the one of the originating ports; and a telephony network connected to at least one of the terminating lines.

11. The system of claim 10, wherein the mapping application is configured to determine, prior to issuing a command of the predetermined set of commands, whether the one of the terminating ports and the one of the originating ports requested by a user are available in the digital cross connect.

12. A method, comprising:
receiving a request to establish a requested connection in a digital cross connect between a first port and a second port;
determining whether each of the first port and the second port are on a list of ports that are available for the connection;
determining present connections for each of the first port and the second port;
determining whether the first port and the second port requested by a user may be accessed by the user;
determining whether the first port and second port may be connected to each other according to a type of equipment associated with each of the first port and the second port;
retrieving a command from a queue in a configuration database that includes a set of predetermined commands for establishing a connection in the digital cross connect; and
issuing the command to the digital cross connect to establish the requested connection.

13. The method of claim 12, further comprising determining if the first port is presently connected to the second port.

14. The method of claim 12, further comprising issuing a command to tear down a first connection to at least one of the first port and the second port prior to issuing the command.

* * * * *